United States Patent Office 3,573,334
Patented Mar. 30, 1971

3,573,334
OLEFINIC SILICONE-ORGANIC POLYMER GRAFT COPOLYMERS
Marshall L. Wheeler, Jr., Tonawanda, N.Y., assignor to Union Carbide Corporation
No Drawing. Continuation-in-part of application Ser. No. 356,944, Apr. 2, 1964. This application Dec. 29, 1964, Ser. No. 422,037
Int. Cl. C08g 22/44, 47/02, 47/10
U.S. Cl. 260—448.2                2 Claims

ABSTRACT OF THE DISCLOSURE

Silicone-organic polymer graft copolymers produced by grafting (1) an olefinic silicone compound to (2) a non-crosslinked organic polymer consisting essentially of at least six recurring divalent monomeric units, at least one of which units contains a hydrogen atom directly bonded to an aliphatic carbon atom, said graft copolymers having been produced by heating a mixture of (1) and (2) in the presence of a free radical generator.

The graft copolymers are useful as lubricants, emulsifiers and stabilizers for urethane foams.

---

This application is a continuation-in-part of application Ser. No. 356,944, filed Apr. 2, 1964, now abandoned.

This invention relates generally to silicone-organic polymer graft copolymers and to processes for preparing same. More particularly, it relates to silicone-organic polymer copolymers to which the name "graft" copolymer is applied in that at least one silicone group is attached as a side chain to at least one organic polymer by means of a hydrolytically stable linkage along the "backbone" provided by the organic polymer chain.

Prior to the present invention, a number of types of silicone-organic polymer copolymers have been prepared. By way of illustration, siloxane-polyoxyalkylene block copolymers in which the siloxane and polyoxyalkylene blocks are connected through Si—O—C bonds have been obtained by transesterification of alkoxy endblocked siloxane polymers with oxyalkylene polymers containing one or two terminal hydroxyl substituents. The utility of these copolymers is somewhat limited due to hydrolytic instability inherent in the Si—O—C linkages present. Hydrolytically stable siloxane-oxyalkylene copolymers have also been synthesized a variety of reactions, e.g. by addition reactions between siloxane polymers containing silanic hydrogen and oxyalkylene polymers having olefinically unsaturated groups attached to the ends of the oxyalkylene chain, by reaction of siloxanes containing organofunctional carboxyl substituents with monohydroxy terminated oxyalkylene polymers, etc. While such copolymers have the desired hydrolytic stability and are useful in a variety of applications, the starting siloxane or oxyalkylene polymers required for their synthesis are either difficult to prepare in a controllable manner or are commercially unavailable. In addition, because of the rigid stoichiometry involved in their synthesis, the range of copolymer compositions which can be prepared from such processes is somewhat limited. Similar problems have arisen in attempts to prepare other types of silicone-organic polymer copolymers.

In accordance with the present invention, it has been found that novel silicone-organic polymers copolymers wherein the silicone portions is attached to the organic polymer portions via a hydrolytically stable silicon to carbon linkage are readily prepared by the free radical-catalyzed graft copolymerization of certain organic polymers with silicone compounds containing olefinic unsaturation. More particularly, the process comprises heating, in the presence of a free radical generator, a homogeneous reaction mixture of a non-crosslinked organic polymer, which is free of silicon atoms and olefinic unsaturation, consisting essentially of at least six recurring divalent monomeric units, at least one of which units contains a hydrogen atom directly bonded to an aliphatic carbon atom, and a silicone compound containing at least one olefinically unsaturated substituent attached to silicon and being substantially free of Si—H bonds.

While not wishing to be bound by any particular theory or mechanism, the grafting reaction involved in the process of this invention is thought to be initiated by a free radical generator, such as a peroxide, through abstraction from the organic polymer of a hydrogen atom that is bonded to an aliphatic carbon atom. The resulting "activated" organic polymer, which now contains a free radical site along the polymer chain, reacts with an olefinically unsaturated silicone compound by addition to the carbon-carbon double bond thereby forming an "activated" silicone-organic polymer copolymer containing a free radical site. The "activated" silicone-organic polymer can stabilize itself by abstraction of hydrogen from unreacted organic polymer present (chain transfer) or by undergoing subsequent reaction with unreacted olefinically unsaturated silicone in a manner characteristic of free radical catalyzed vinyl polymerizations. The graft copolymer has a bond produced by a grafting reaction involving the removal of a carbon-bonded hydrogen atom of the organic polymer followed by the reaction of the latter carbon atom with a group represented by R in the silicone compound to form a bond between the organic polymer and the silicone compound.

The resulting novel graft copolymers of this invention thus formed can be graphically illustrated as:

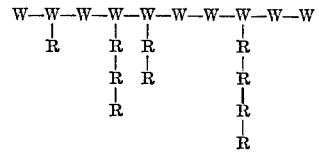

wherein W represents a repeating unit of the organic "backbone" polymer and R represents a repeating unit of the silicone compound employed, the first R unit of each side chain silicone moiety attached to the backbone polymer being bonded thereto by a carbon-to-carbon bond. More specifically illustrative is the following structural configuration in which a particular organic polymer (i.e. an oxyalkylene polymer) and silicone compound (i.e. a siloxane) are set forth as being typical only and not in any way limitative of the proper scope of the invention:

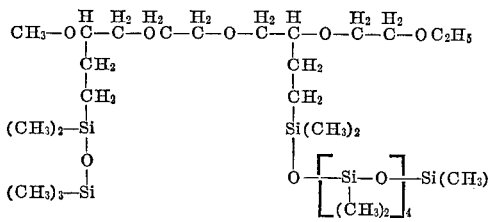

The silicone compounds employed in producing the graft copolymers of this invention contain at least one olefinically unsaturated substituent attached to silicon and are substantially free of SiH bonds. As used herein, the term "silicone" is employed in a generic sense to denote both organo-silicon monomers (silanes) and organosilicon polymers (siloxanes).

Among the silicone compounds used in producing the graft copolymers of this invention are silanes having the formula:

$$R_aSiX_{4-(a+b)}^{R'_b} \quad (I)$$

wherein R is an olefinically unsaturated monovalent hydrocarbon group, R' is a monovalent hydrocarbon group free of aliphatic (olefinic or acetylenic) unsaturation, $a$ has a value from 1 to 3 inclusive, $b$ has a value from 0 to 2 inclusive, $(a+b)$ has a value from 1 to 3 inclusive and X is an OH group or a hydrolyzable group that is non-reactive under the conditions employed in producing the graft copolymer (e.g. the methoxy, acetoxy, propionyloxy, phenoxy, tertiary-butoxy, or fluorine atoms). Illustrative of such silanes are: $CH_2=CHSiF_3$, $CH_2=CHSi(CH_3)(OCH_3)_2$, $CH_2=CHSi(OOCCH_3)_3$ $CH_2=CHCH_2Si(C_6H_5)_2OC(CH_3)_3$, etc.

Illustrative of the groups represented by R in Formula I are the alkenyl groups (e.g. the vinyl, allyl, methallyl, and butenyl groups), the cycloalkenyl groups (e.g. the cyclopentenyl and the cyclohexenyl groups) and the alkenylaryl groups (e.g. the vinyl phenyl group, $CH_2=CHC_6H_5-$).

Illustrative of the groups represented by R' in Formula I are the alkyl groups (e.g. the methyl, ethyl, propyl, and butyl groups), the aryl groups (e.g. the phenyl and naphthyl groups), the aralkyl groups (e.g. the beta-phenylethyl groups) and the cycloalkyl groups (e.g. the cyclopentyl and cyclohexyl groups).

Additional silicone compounds useful in producing the graft copolymers of this invention are siloxanes consisting essentially of groups having the formula $$R_aSiO_{\frac{4-(a+b)}{2}}^{R'_b} \quad (II)$$

where R, R', $a$, $b$, $(a+b)$ have the meanings defined for Formula I.

Useful silicone compounds of the siloxane variety also includes siloxanes consisting esentially of from 2 to 98 mole-percent (preferably from 10 to 40 mole-percent of groups represented by Formula I and from 2 to 98 mole-percent (preferably from 60 to 90 mole-percent) of groups having the formula $$R'_cSiO_{\frac{4-c}{2}} \quad (III)$$

wherein R' has the meaning defined in Formula I and $c$ has a value from 1 to 3 inclusive.

The above-described siloxanes that are useful in this invention can contain unhydrolyzed groups represented by X in Formula I [e.g. acetoxy groups] as end-blocking groups.

Suitable siloxanes of the trifunctional variety can be more specifically depicted as containing the structural unit $$R-SiO_{\frac{3-c}{2}}^{X_c}$$

wherein R and X represent the same groups as defined hereinbefore with respect to Formula I, and $c$ has an average value of from 0 to 1 and can be as high as 2 but preferably is from 0.1 to 1. Polysiloxanes of this variety which are essentially free of silicon-bonded X groups (i.e. $c$ is zero) can be prepared by the complete hydrolysis and complete condensation of hydrocarbyltrimethoxysilanes, whereas the hydrocarbylpolysiloxanes in which X represents predominantly silicon-bonded methoxy groups can be prepared by the partial hydrolysis and complete condensation of the same starting silane. On the other hand, hydrocarbylpolysiloxanes in which X represents predominantly silicon-bonded hydroxyl groups can be prepared by the essentially complete hydrolysis and partial condensation of the same hydrocarbyltrimethoxysilanes. By way of illustration a vinyl-polysiloxane containing silicon-bonded methoxy groups can be prepared by hydrolyzing vinyl-trimethoxysilane with an amount of water insufficient to react with all of the silicon-bonded methoxy groups present on the starting silane and subsequently condensing the hydrolysate so formed to produce the desired polymer.

Suitable siloxanes of the difunctional varieties which includes cyclic and linear polysiloxanes, can be more specifically illustrated by the structural formula:

$$\left[ R_aSi-O \right]_f^{R'_b}$$

wherein $a$ is an integer having a value of from 1 to 2, $b$ has a value of 0 to 1, R and R' represent the same groups as defined hereinbefore in Formula I; and wherein $f$ is an integer having a value of at least 3, and can be as high as 15 or even higher, for the cyclic hydrocarbylpolysiloxanes and higher for the linear hydrocarbylpolysiloxanes. Such cyclic and linear polysiloxanes can be prepared by the hydrolysis and condensation of hydrocarbyl(hydrocarbyl)dimethoxysilanes or di(hydrocarbyl) dimethoxysilanes. In carrying out the hydrolysis and condensation procedures there is produced a product comprising a mixture of cyclic and linear polysiloxanes from which the desired polysiloxane can be isolated and recovered. Illustrative of the cyclic polysiloxanes suitable for use in this invention are the cyclic tetramer of vinyl (propyl)siloxane and the like. Illustrative of linear polysiloxanes are 1-allyl(methyl)polysiloxane, vinylbutylpolysiloxane, para-vinylphenylheptylpolysiloxane, di(butenyl) polysiloxane, and the like.

Included among the linear siloxanes which can be employed in our process are the alkyl, methoxy, acetoxy, or hydroxyl end-blocked polysiloxanes which contain from 1 to 3 of such groups bonded to the terminal silicon atoms of the molecules comprising the polymer chains. Thus there can also be employed as the starting hydrocarbylsilicon compound such linear end-blocked hydrocarbylpolysiloxanes as monoacyloxy end-blocked vinylpropylpolysiloxane or methyldimethoxysilyl end-blocked butenylmethylpolysiloxane, and the like. The end-blocked linear hydrocarbylpolysiloxanes useful in our process can be prepared by the equilibration of cyclic hydrocarbyl polysiloxanes with silicon compounds containing predominantly silicon-bonded X groups, or by cohydrolysis and condensation of trialkylmethoxysilanes with hydrocarbylalkoxysilanes. Hydroxyl end-blocked linear polysiloxanes can also be prepared by heating linear or cyclic hydrocarbylpolysiloxanes with water.

Although siloxanes containing methoxy and hydroxyl groups are in general operable, it is preferred that such groupings be present only in minor amounts to keep undesirable side reactions to a minimum. In particular when oxylalkylene polymers having terminal hydroxyl groups are employed as the organic polymer, the use of alkoxy-containing siloxanes is preferably avoided to prevent reaction between alkoxy substituents attached to silicon and the hydroxyl groups of the oxyalkylene polymer.

Siloxane polymers containing silanic hydrogen or free radical inhibiting substituents are especially to be avoided since the presence of such substituents can alter the course of the grafting reaction or prevent it from occurring. Trace amounts of such substituents are, of course, permissible.

The organic polymers that are suitable for use in producing the graft copolymers of this invention are non-cross-linked materials. That is, they are not solids or gels but can, of course, have a certain amount of branching. Included are both liquid polymers (including those that are capable of further polymerization to form solid thermoplastic or thermoset polymers) and thermoplastic solid polymers. Suitable polymers consist essentially of at least six recurring divalent monomeric units, at least one of which contains a hydrogen atom bonded directly to an aliphatic carbon atom.

Illustrative of the organic polymers which are useful as starting materials in the process of this invention are those represented generally by the formula:

(IV)

wherein W and Y represent the same or different repeating units of the organic polymer, A and B are the end groups of the polymer and $n$ is an integer having values of 3 or greater. W and Y preferably represent repeating units of organic polymers which are thermoplastic, that is polymers which can be softened with heat and while soft can be molded, cast or extended under pressure. These polymers when cooled below their softening point become rigid and retain the shape of the mold. However, on reheating, these materials again become soft and can be remolded.

Illustrative of the repeating units W and Y of Formula IV which can make up the organic polymers which are useful as starting materials in the process of this invention are

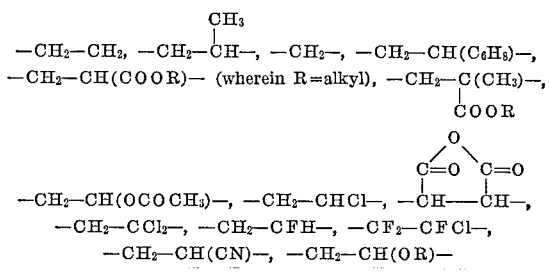

(wherein R is alkyl such as methyl, ethyl, propyl, and butyl), and the like. It is, of course, understood that organic polymers which are useful as starting materials in this invention include not only those polymers which consist of only one or two different units but also include those containing 3 or more different units. These organic polymers are commonly prepared by well known free radical polymerization or copolymerization processes. Commonly in processes of this type the end groups represent free radical initiator fragments or groups picked up by chain transfer processes.

Illustrative of another class of repeating units W and Y in Formula IV, which can make up the organic polymers which are useful as starting materials in the process of this invention are those which make up thermoplastics such as polyurethanes, polyesters such as Dacron and Orlon, epoxy resins, polyacetals such as Delrin, polysulfides such as Thiokol, polycarbonates, phenoxy resins, and the like. These organic polymers are commonly prepared by ionic process which may or may not involve the elimination of volatile by-products. Such processes are well known. In these polymers the end groups may be derived from either or both of the co-reactants used to make up the polymer.

Oxyalkylene polymers which have been found useful as the organic polymer starting material in the process of this invention can be represented generally by the following formula:

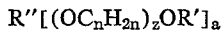

wherein R' is hydrogen, acyl or a hydrocarbon radical; R" is hydrogen, a monovalent, divalent or polyvalent hydrocarbon radical; $a$ is an integer equal to the valence of R", $n$ in each occurrence is an integer from 2 to 4 inclusive, $z$ in each occurrence is an integer having a value of from 0 to about 200, preferably from 0 to about 120, with the proviso that at least one $z$ in the formula has a value of at least 2, and preferably at least 5. Preferably the values of $z$, $n$, and $a$ are such that the polymer has a molecular weight of from about 100 to about 10,000, with molecular weight values of from about 200 to 6,000 being especially preferred. These oxyalkylene polymers include mono-, di-, and polyhydroxy terminated polyoxyalkylenes and their hydrocarbon ether derivatives, oxyalkylene polymers terminated with ester groups, or combinations thereof.

Illustrative of suitable monohydroxy polyoxyalkylene ether starting materials are polyoxypropylene monoethers such as those described in U.S. Pat. No. 2,448,664, Fife et al., monohydroxy oxyethylene oxy-1,2-propylene monoethers having both oxyethylene and oxypropylene units in the molecule such as those described in U.S. Pat. No. 2,425,755, Fife et al. monohydroxy polyoxyalkylene ethers containing both oxyethylene and oxypropylene units in the molecule formed by the sequential addition of ethylene oxide and propylene oxide to a monohydric alcohol, monohydroxy polyoxyethylene monomethylethers formed by the addition of ethylene oxide to methanol, monohydroxypolyoxyalkylene dialkyl ethers formed by the addition of an alkylene oxide to the dialkyl ether of glycerol, and the like. Illustrative of suitable dihydroxy oxyalkylene polymer starting materials are diethylene glycol, tetraethylene glycol, diisopropylene glycol, tetrabutylene glycol, polyethylene glycol polypropylene glycol and the like. Illustrative of suitable polyhydroxy oxyalkylene polymer starting materials are trihydroxy terminated polyoxypropylenes formed by addition of propylene oxide to glycerol, trihydroxy terminated polyoxyethylenes formed by addition of ethylene oxide to trimethylolpropane, tetrahydroxy terminated oxyethylene-oxypropylene polymers formed by addition of ethylene oxide and propylene oxide to pentaerythritol, polyhydroxy terminated polyoxypropylenes formed by addition of propylene oxide to sorbitol, and the like.

Hydrocarbon ether derivatives of the hydroxylated oxyalkylene polymers found useful in preparing the graft copolymers of this invention are readily prepared by reaction of the potassium salt of the hydroxyoxyalkylene polymer with an alkyl halide or by vinylation of the hydroxy group with acetylene followed by reduction of the resulting vinyl ether with hydrogen. Illustrative of these derivatives are dimethyl ethers of polyethylene glycol, diethyl ethers of polypropylene glycol, butyl, cyclohexyl, vinyl, or allyl ethers of the monohydroxy polyoxyalkylene monoethers described in the aforementioned Fife et al. Pats. U.S. 2,425,755 and U.S. 2,448,664, and the like.

Useful oxyalkylene polymer starting materials terminated with ester groups include, by way of illustration, acetoxy and benzoxy derivatives of the corresponding hydroxyl terminated ozyalkylene polymers and the like. Such ester terminated oxyalkylene polymers are readily obtained by reaction of the hydroxy terminated polymer with acetic anhydride or benzoyl chloride.

While the above oxyalkylene polymer compositions are to be preferred as starting materials, in general, the molecular structure of the oxyalkylene polymer is not critical and can contain other groupings (e.g. carbonyl, amide, trialkylsiloxy, etc.). Almost any oxyalkylene polymer can be employed except those containing groups which inhibit free radical reactions.

A free radical generator is essential as a catalyst in preparing the silicone-organic polymer graft copolymers of this invention. The free radical generators which are operative in this invention include ionizing radiaton, organic peroxides and azo compounds.

Illustative of the organic peroxides which can be employed are hydroperoxides such as t-butyl hydroperoxide, cumene hydroperoxide, tetralin hydroperoxide, and triphenylmethylhydroperoxide; peroxy acids such as peroxy acetic acid, peroxybenzoic acid, monoperoxyphthalic acid, diperoxyphthalic acid, and 2,4-dichloroperoxybenzoic acid; diorganoperoxides such as di-tertiary butyl peroxide, ascaridol, benzoyl peroxide, 2,4-dichlorobenzoyl peroxide, t-butyl perbenzoate, diacetyl peroxide dicumyl peroxide, di-t-butyldiperoxyphthalate, $(Me_3COO)_2CMe_2$, and the like.

The azo compounds which are operative are those containing tertiary carbon atoms attached to each nitrogen atom of the azo linkage. Illustrative of the compounds which can be employed are:

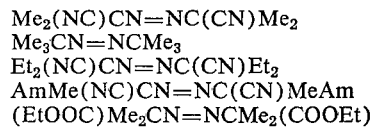

Me, Et, and Am represent methyl, ethyl and amyl radicals in the above formulas. Diorganic peroxides, as for example di-tertiary butyl peroxide are preferred catalysts for the grafting reaction. The amount of free radical catalyst employed is not critical although catalyst concentrations from .1%–10% by weight based on the weights of siloxane and oxylalkylene polymers in the reaction mixture can be used advantageously. The amount of catalyst generally preferred ranges from 1.0–5% by weight.

Although it is preferred to use as the ionizing radiation beta particles from an electromechanical source, other sources of radiation can be used, such as ultra violet light, gamma rays, X-rays, protons (hydrogen ions), deutrons (heavy hydrogen ions) or positive ions such as alpha particles. Beta radiation (high speed electrons) obtained from radio-active isotopes such as a strontium 90-yttrium 90-equilibrium mixture can be used with similar results. Gamma rays, that is electromagnetic radiation similar to light but covering the wavelength range of 0.1 angstrom unit (A.U.) to 0.001 A.U. may be obtained, for example, from Cobalt 60 isotope or from a 2 million electron volt (mv.) Van de Graaff electron accelerator equipped with a gold or tungsten target. Alpha particles can be obtained most easily from radioisotopes such as polonium 210. X-rays, electromagnetic radiation similar to light but covering the wavelength range of 10 angstrom units (A.U.) to 0.1 A.U. (1 A.U.=$10^{-8}$ cm.), can be obtained from an X-ray machine of, for example, one-half million volts converted to use for the purpose of this invention. It will be apparent that we intend the term ionizing radiation as it is used herein to embrace gamma and X-rays, as well. These latter rays, while they do not carry an electric charge do in their passage through matter, eject electrons and the latter, being electrically charged, are able to produce ionization. Dosages of at least 1 megarep, and preferably from 2 to 6 megareps are suitably employed.

The temperature at which the reaction is carried out to produce the graft copolymers of this invention will depend on the free radical inducing chemical compound employed and should be high enough to cause formation of free radicals in the reaction mixture. Suitable temperatures range from 30–225° C. with 80–175° C. being the preferred range. Often, the olefinically unsaturated silicones are not miscible with organic polymers and difficulties arise in reacting these materials unless a suitable solvent is used, such as, for example, toluene or xylene. The reaction temperature is, therefore, limited by the reflux temperature of the solution and a higher boiling solvent will permit a higher temperature. The type of solvent is critical only insofar as the starting materials must be mutually soluble therein and the solvent must be relatively inert to free radical attack. It is also necessary that the amount of solvent be sufficient to provide a homogeneous solution of the starting materials at the reaction temperature. While the reaction can be carried out at subatmospheric or superatmospheric pressure there is usually no advantage to doing so.

The relative amounts of olefinic silicone and organic polymer used in preparing the graft copolymers of this invention depends to a large extent upon the number and reactivity of the olefinic substituents in the silicone as the weight percent of silicone desired in the copolymer. When the silicone contains an average of only one olefinic substituent the ratio of silicone reactant to organic reactant can vary over an almost unlimited range being controlled chiefly by practical considerations. Usually the preferred amount of silicone in the copolymer is from 5 to 95 percent by weight based on the total graft copolymer used since smaller amounts do not normally give graft copolymers with widely useful properties.

A surprising feature of the process in the present invention is that siloxane polymers containing a multiplicity of olefinic substituents can be grafted to oxyalkylene polymers without the formation of crosslinked gels. While a broad range of copolymer compositions can be prepared from such materials it is generally preferred to use a reactant ratio which will give 5–50 percent by weight of siloxane in the copolymer. When fluid copolymers containing higher percentages of siloxane are desired these are readily obtained by fractionation of the grafted copolymer with a suitable solvent to remove copolymer compositions low in siloxane. Silvent fractionation procedures are also useful in removing ungrafted oxyalkylene polymer from the copolymer particularly when the oxyalkylene polymer is of low molecular weight. In most cases, formation of crosslinked gels can be prevented if the mole ratio of oxyalkylene units in the oxyalkylene polymer to olefinic substituents in the siloxane polymer is greater than eight to one during the grafting process. Gelation in the copolymer can also be minimized by adding a mixture of the olefinic siloxane and free radical catalyst dropwise to a refluxing solution of the oxyalkylene polymer over a longer reaction time than that used when all the reactants are heated together. Of course, where high viscosity or gelled products are desirable, a much higher ratio of siloxane to oxyalkylene polymer can be employed.

The hydrolytically stable graft copolymers of this invention range in properties from water soluble materials to water insoluble materials depending on the type of organic polymer used and the weight percent of silicone present. Thus siloxane-polyoxyalkylene graft copolymers in which the oxyalkylene polymer chain is composed of oxypropylene units are water-insoluble whereas they may be soluble when the oxyalkylene polymer chain contains oxyethylene units depending on the polysiloxane-polyoxyalkylene ratio.

The graft copolymers of this invention are useful as rubber lubricants, particularly for tire molds, lubricants for metal-to-metal moving surfaces and textile lubricants. In addition, the copolymers of this invention are particularly useful as stabilizers for urethane foams. Foams so stabilized have the same utilities as conventional urethane foams. Accordingly, polyurethane foams can be prepared by mixing together an organic isocyanate and a polyether containing active hydrogen and thereafter developing the foam reaction between these reactants. The mixture is foamed in the presence of a catalyst and a graft copolymer of this invention as a foam stabilizer by means of a blowing agent such as water, a fluorocarbon or other inert gas, or mixtures thereof.

Polyurethane foamed products containing graft copolymers of this invention as foam stabilizers can be produced by known processes. One process is a one-shot technique wherein all of the reactants are reacted simultaneously with the foaming operation. The second type of general process is the prepolymer process. In this latter method a prepolymer is formed by completing the reaction between the polyether and the isocyanate. The prepolymer can later be foamed by reaction with water or inert blowing agent. Also, the quasi-prepolymer technique can be used to produce foams. In this technique, the isocyanate is first reacted with a portion of the polyether to give a product having a high percentage of free —NCO groups (e.g. from 20 to 50 percent), and this product is subsequently foamed by reaction with polyol and foaming agent.

The above-described processes are well known and are generally suitable for use with foam formulations containing graft copolymers of this invention as foam stabilizers.

Thus, the foam formulations of this invention contain (1) a polyether (or mixture of polyethers) containing at least two active hydrogen atoms, (2) an organic isocyanate (or mixture of organic isocyanates) containing at least two isocyanate groups, (3) a catalyst (or mixture of catalyst), (4) a blowing agent and (5) a graft copolymer of this invention. The polyethers used in these formulations are also known as "polyols." It is often convenient to provide mixtures of a graft copolymer of the invention and one or more, but not all, of the other components of the above-mentioned foam formulations. Such mixtures can be blended with the remaining components just prior to use in producing a foam. Such mixtures can be stored indefinitely without significant deterioration or reaction occurring due to the hydrolytic stability of the graft copolymers. Suitable mixtures include graft copolymer-polyether mixtures; graft copolymer-catalyst mixtures; and graft copolymer-polyether-catalyst mixtures.

The active hydrogen-containing polyethers in the foam formulations of this invention include the linear and branched chain polyethers which have a plurality of acyclic ether oxygens and contain at least two hydroxyl radicals. Such hydroxyl groups are preferably alcoholic hydroxyl groups (as distinguished, for example, from the hydroxyl groups in carboxy groups, —COOH) and are most preferably attached to aliphatic carbon atoms (i.e. carbon atoms not in an aromatic ring). The polyethers have molecular weights, based on their hydroxyl values, ranging from 50 to 7500. Illustrative polyethers include the polyoxyalkylene polyols containing one or more chains of connected oxyalkylene radicals which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the polyoxybutylene glycols and copolymers such as polyoxyethylene oxybutylene glycols and polyoxypropyleneoxybutylene glycols. Included in the term "polyoxybutylene glycols" are polymers of 1,2-butylene oxide, 2,3-butylene oxide and 1,4-butylene oxide.

Other acylic and alicyclic polyols which can be reacted with ethylene oxide, propylene oxide, butylene oxide or mixtures thereof to provide polyethers that are useful in the foam formulation of this invention include glycerol, trimethylolpropane, 1,2,6-hexanetriol, pentaerythritol, sorbitol, and glycosides. Further polyethers that are useful in the foam formulation of this invention are prepared by reacting a 1,2-alkylene oxide such as ethylene oxide, propylene oxide, butylene oxide or mixtures thereof with monocuclear polyhydroxybenzenes such as resorcinol, pyrogallol, phlorofiucinol and hydroquinone.

Other polyethers which can be employed in the foam formulations of this invention are those obtained by reacting 1,2-alkylene oxides or mixtures thereof with polynuclear hydroxybenzenes such as the various di, tri, and tetraphenylol compounds in which two to four hydroxybenzene groups are attached by means of single bonds or by an aliphatic hydrocarbon radical containing one to twelve carbon atoms. Tetraphenylol compounds which can be reacted with 1,2-alkylene oxides to produce polyethers that are useful in the foam formulations of this invention include the alpha, alpha, omega, omega-tetrakis(hydroxyphenyl)alkanes such as 1,1,2,2-tetrakis(hydroxyphenyl)ethanes. Other polyethers which can be employed in the foam formulations of this invention are the ethylene oxide, propylene oxide and butylene oxide adducts of phenol-formaldehyde condensation product materials such as the novolaks. Polyethers suitable for use in the foam formulations of this invention are prepared by reacting one or more of the alkylene oxides above noted with acyclic polyamines such as ethylenediamine, propylenediamine, etc.

Other suitable polyethers useful in the foam formulations of this invention include the 1,2-alkylene oxide derivatives of mononuclear primary amines such as o-, m-, and p-phenylenediamine. Higher functional mono- and polynuclear polyamines which also can be reacted with 1,2-alkylene oxides to provide polyethers suitable for use in the foam formulations of this invention include 2,4,6-triaminotoluene and 2,3,5-triaminotoluene.

In addition to the hydroxyl-containing polyethers described above, many other classes of compounds containing active hydrogen atoms can react with organic isocyanates to produce urethane resin foams. Examples of other operable active hydrogen-containing compounds are hydroxy-containing polyesters, polyamides and polyamines. The graft copolymers of this invention are also foam stabilizers for urethane foam formulations containing such polyesters, polyamides, and polyamines.

The polyesters referred to are prepared by a condensation reaction between a stoichiometric excess of one or a mixture of two or more of the above-described polyols and one or a mixture of two or more dibasic carboxylic acids such as adipic, succinic, azelaic, glycolic, glutaric or sebacic acid. The stoichiometric excess of polyol is employed to insure the presence of at least an average of two hydroxyl groups per polyester molecule. For example, when 1.0 mole of adipic acid is condensed with 1.35 moles of a mixture containing approximately equal molecular amounts of ethylene glycol, diethylene glycol, and butylene glycol, the resulting polyester has a hydroxyl number of 60, an acid number of 2 and a corresponding average molecular weight of about 1800.

The molecular weight of the polyethers used should range from 250 to 7500 depending upon the characteristics desired in the foamed urethane product. As a general rule for flexible open-cell urethane foams the polyether should have a molecular weight of from about 1800 to 5000. Lower molecular weight values give rise to rigid and semi-rigid foams.

A variety of organic isocyanates can be employed in the foam formulations of this invention for reaction with the polyethers above described to provide urethane foams. Preferred isocyanates are polyisocyanates and polyisothiocyanates of the general formula:

$$Q(NCY)_i$$

wherein Y is oxygen or sulfur, $i$ is an integer of two or more and Q is an alkylene, substituted alkylene, arylene or substituted arylene radical, a hydrocarbon, or substituted hydrocarbon radical containing one or more aryl —NCY bonds and one or more alkyl —NCY bonds. Q can also include radicals such as —QZQ— where Z can be a divalent moiety such as —O—, —O—Q—O—, —CO—, —CO$_2$—, —S—, —S—Q—S— and —SO$_2$—. Examples of such compounds include hexamethylene diisocyanate, 1,8-diisocyanato, p-methane, xylylene diisocyanate, (OCNH$_2$CH$_2$CH$_2$OCH$_2$)$_2$, 1 - methyl-2,4-diisocyanatocyclohexane, phenylene diisocyanates, tolylene diisocyanates, chlorophenylene diisocyanates, diphenylmethane-4,4'-diisocyanate, naphthalene-1,5 - diisocyanate, triphenylmethane-4,4'4''-triisocyanate, xylene-alpha, alpha'-diisothiocyanate, and isopropylbenzene-alpha-4 - diisocyanate.

Further included among the isocyanates useful in the foam formulations of this invention are dimers and trimers of isocyanates and diisocyanates and polymeric diisocyanates of the general formula:

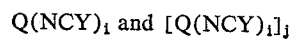

$$Q(NCY)_i \text{ and } [Q(NCY)_i]_j$$

in which $i$ and $j$ are integers of two or more, as well as compounds of the general formula:

$$L(NCY)_i$$

in which $i$ is one or more and L is a monofunctional or polyfunctional atom or radical. Examples of this type include ethylphosphonic diisocyanate, $C_2H_5P(O)(NCO)_2$; phenylphosphonic diisocyanate, $C_6H_5P(O)(NCO)_2$; compounds containing a $\equiv$Si—NCY group, isocyanates derived from sulfonamides ($QSO_2NCO$), cyanic acid, thiocyanic acid, and compounds containing a metal —NCY radical such as tributyltin isocyanate.

The amount of isocyanate employed in the foam formulation of this invention will depend upon the density of the urethane foam and the amount of cross-linking desired. In general, the total —NCO equivalent to total active hydrogen equivalent of the polyether should be such as to provide a ratio of 0.8 to 1.2 equivalents of —NCO per equivalent of active hydrogen, and preferably a ratio of 1.0 to 1.1 equivalents.

The foaming of the foam formulations of this invention is effected by methylene chloride, by water, by liquefied fluorocarbon gases which have boiling points below 80° F. and above —60° F., or by other inert gases such as nitrogen, carbon dioxide, methane, helium, and argon. The liquefied gases are saturated aliphatic fluorohydrocarbons which vaporize at or below the temperature of the foaming mass. Such gases are at least partially fluorinated and can also be otherwise halogenated.

Fluorocarbon blowing agents suitable for use in foaming the formulations of this invention include trichloromonofluoromethane; dichlorodifluoromethane; dichlorofluoromethane; 1,1-dichloro-1-fluoroethane; 1-chloro-1,1-difluoro, 2,2-dichloroethane; and 1,1,1-trifluoro, 2-chloro-2-fluoro, 3,3-difluoro-4,4,4-trifluorobutane. The amount of blowing agent used will vary with density desired in the foaming product. In general, it may be stated that for 100 grams of resin mix containing an average NCO/OH ratio of 1 to 1, 0.005 to 0.3 mole of gas is used to provide densities ranging from 30 to 1 pounds per cubic foot. If desired, water can be used in conjunction with the inert gas or fluorocarbon blowing agent, or water can be used as the only blowing agent.

Catalysts that are suitable for accelerating the polyether-isocyanate reaction in the foam formulations of this invention include amines and a wide variety of metal compounds, both inorganic metal compounds and metal compounds which contain organic groups. Particularly useful catalysts are tertiary amines and organo-tin compounds. All of the above catalysts can be used alone or in mixtures with one or more of the other such catalysts.

Among the organo-tin compounds suitable for use in the foam formulations of this invention that deserve particular mention are stannous acylates such as stannous acetate, stannous octoate, stannous laurate and stannous oleate; stannous alkoxides such as stannous butoxide, stannous 2-ethylhexoxide and stannous phenoxide, o-, m-, and p-stannous cresoxides; dialkyl tin salts of carboxylic acids, e.g., dibutyltin diacetate, dibutyltin dilaurate, dibutyltin maleate, dilauryltin diacetate, and dioctyltin diacetate. Similarly, there can be used a trialkyltin hydroxide, dialkyltin oxide or dialkyltin chloride. Examples of these compounds include trimethyltin hydroxide, tributyltin hydroxide, trioctyltin hydroxide, dibutyltin oxide, dioctyltin oxide, dilauryltin oxide, dibutyltin dichloride and di-octyltin dichloride.

The tertiary amines which are useful as catalysts in the foam formulations of this invention include tertiary amines substantially unreactive with isocyanate groups and tertiary amines containing active hydrogen atoms reactive with isocyanate groups. Typical tertiary amines which are substantially unreactive with isocyanate groups include triethylamine, tributylamine, trioctylamine, N-methylmorpholine, N-ethylmorpholine, N-octadecylmorpholine (N-Cocomorpholine), N,N,N',N' - tetramethyl- ethylenediamine, N,N,N',N' - tetramethyl-1,3-propanediamine, and triethylenediamine.

Typical tertiary amines containing active hydrogen atoms reactive with isocyanate groups suitable for use in the foam formulations of this invention include dimethylethanolamine, triethanolamine, triisopropanolamine, N-methyldiethanolamine, N-ethyldiethanolamine, polyoxyalkylene polyol polymers and copolymers of alkylene oxides, such as propylene oxide, ethylene oxide, homopolymers, copolymers and mixtures thereof started with triethanolamine, triisopropanolamine, ethylenediamine, ethanolamine, and diethylenetriamine. Still other tertiary amines containing active hydrogen atoms reactive with isocyanate groups include polyesters based on polyols such as illustrated above including triethanolamine, triisopropanolamine, and N-alkyl diethanolamines, as well as polycarboxylic acids containing tertiary nitrogen atoms.

Other catalysts suitable for use in the foam formulations of this invention include metal organic compounds of lead, arsenic, antimony, and bismuth compounds characterized by the presence therein of a direct carbon-to-metal bond; organic halides of titanium; the inorganic halides of tetravalent tin, arsenic, antimony, bismuth, and titanium; polystannates; tin, titanium and copper chelates; and mercury salts.

Still other catalysts suitable for use in the foam formulations of this invention include tertiary phosphines (such as trialkylphosphines and dialkylbenzylphosphines), strong bases (such as the alkali and alkaline earth metal hydroxides, alkoxides and phenoxides), chelates of various metals (such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkyl-enediimines, salicylaldehydeimine, and the like, with various metals such as Be, Mg, Zn, Cd, etc.

In addition to the above described polyethers, graft copolymers, polyisocyanates, catalysts and blowing agents, the polyurethane foam compositions of this invention may contain, if desired, other components such as:

(a) diol forming modifiers, such as ethylene glycol, polyethylene glycol and the like;
(b) crosslinking agents, such as pentaerythritol, glycerol, N,N,N',N'-tetrakis(2 - hydroxypropyl)ethylene diamine, and the like;
(c) flame retardants, generally alkyl phosphates or inorganic compounds, such as antimony oxide and the like;
(d) thermal stabilizers, such as d-tartaric acid, t-butyl catechol and the like;
(e) plasticizers, such as di-octyl phthalate and the like;
(f) fillers such as scrap shredded foam, wood flour, metal flakes, and the like; and
(g) pigments, such as titania, silica, carbon black, and the like;
(h) dyes, antioxidants, antiozonants, deodorants, fungicides, and the like.

The amounts of the various components employed in the foam formulations of this invention are not narrowly critical.

When water is present as a foaming agent, amounts of water from 0.5 to 5 weight percent based on the total weight of the formulations can be advantageously employed.

The amount of catalyst to be employed in the urethane foam formulations of this invention is well understood by persons skilled in the urethane resin foam art. In general, the total amount of catalyst or mixture of catalysts is from 0.001 percent to 5 percent of the foam formulation.

The amount of graft copolymer of this invention employed as a foam stabilizer in the foam formulations of this invention vary over wide limits from about 0.1 weight percent to about 10 weight percent or greater.

Weight percentages are based on the total weight of the foam formulations, that is, the polyether, isocyanate, catalyst, blowing agent, and foam stabilizer.

Since graft copolymers of this invention prepared from hydroxy terminated oxyalkylene polymers retain the hydroxyl function in the copolymer, such materials are capable of subsequent reactions with organic acids, anhydrides, isocyanates, diisocyanates, and other alcohol reactive compounds. These copolymers are useful, in addition to the application set forth above, as reactive intermediates in the formation of a wide variety of novel polymeric materials, as for example, in alkyd resins and polyurethanes.

Blends composed of a mixture of a relatively small amount of a graft copolymer of this invention and a relatively large amount of a thermoplastic organic polymer (such as the organic polymers used in producing the graft copolymers of this invention) possess various highly desirable properties. Such properties enhance the usefulness of the organic polymers in the various areas of application in which they are normally employed. Such properties include improved release from molds wherein molded products are made from the organic polymers, improved levelling of coating compositions containing the organic polymers, improved filler dispersion in the organic polymers, improved adhesion, improved slip, improved anti-block, improved rheological properties, and the like. Particularly useful blends are those composed of copolymers of this invention mixed with relatively large amounts of polystyrene, polyethylene, poly(alkylacrylate) or polyvinyl chloride. Preferably, such blends contain from 0.01 to 10 parts by weight of the graft copolymer per 100 parts by weight of the organic polymer. Even more desirable are the blends containing from 0.1 to 5 parts by weight of the graft copolymer per 100 parts by weight of the organic polymer. Such blends can be conveniently prepared by mixing together the desired amount of the graft copolymer and the thermoplastic organic polymer. Alternatively, the blends can be prepared by reacting the silicone compound as described above with a large excess of the organic polymer by the above-described grafting process. Such blends can contain, as additional components, any of the fillers, stabilizers, plasticizers, diluents, dyes catalysts or other ingredients normally added to the organic polymer to modify the polymer for use in any of the applications in which the organic polymer is conventionally employed.

The following examples illustrate the present invention:

EXAMPLE 1

A vinyl modified dimethylsiloxane fluid of approximately 800 molecular weight and containing an average of three vinyl substituents per siloxane chain was prepared by equilibrating 47.2 g. (0.20 mole) octamethyltrisiloxane, 51.6 g. (0.60 mole) of methylvinylpolysiloxane and 59.2 g. (0.80 mole) of octamethylcyclotetrasiloxane for 48 hours at 150° C. using potassiumdimethylsilanolate (equivalent to 200 p.p.m. potassium) as an equilibration catalyst. The equilibrate was neutralized at 25° C. with 4 ml. of glacial acetic acid, dissolved in 500 ml. of diethyl ether, and water washed to neutrality with several 100 ml. portions of water. The ether solvent was distilled off and the fluid stripped of low boilers to 110° C. at 0.8 mm. of Hg. The resulting silicone polymer weighed 124 g. and had a viscosity of 12 cp. at 25° C. A 100 g. charge of a monohydroxypolyoxyalkylene monobutyl ether composed of 50 weight percent oxyethylene units and 50 weight percent 1,2-oxypropylene units and having an average molecular weight of 2000 was dissolved in 100 ml. of reagent grade xylene and brought to the reflux temperature of the xylene (145° C.) under a nitrogen atmosphere in order to azeotrope traces of water from the system. The water removed, 50 ml. of xylene was distilled off to attain a solution temperature of 155° C. A solution of 3.3 g of di-tertiary butyl peroxide in 33.3 g. of the aforedescribed vinyl containing dimethylpolysiloxane equilibrate was then added dropwise over 2 hours to the rapidly stirred xylene solution. After an addiitonal one-half hour at 155° C. the xylene was removed with a nitrogen sparge to a product temperature of 180° C. The resulting copolymer was a clear fluid weighing 133 g., having a viscosity of 1600 cp. at 25° C. and refractive index $n_D^{25} = 1.4550$. It should be noted that prior to reaction the silicone and polyether reactants are immiscible.

The siloxane-oxyalkylene graft copolymer prepared above was tested for ability to stabilize a urethane foam preparation in the following fashion:

One hundred parts, 350 g. of a poly(1,2-oxypropylene) triol of number average molecular weight 3000 and having greater than 90 percent of the terminal hydroxyl groups as secondary hydroxyls was combined at 25° C. with 4.2 g. (1.2 parts) of the siloxane oxyalkylene copolymer, 14.0 g. (4.00 parts) of distilled water, 0.35 g. (0.10 part) of tetramethylbutanediamine, 0.70 g. (0.20 part) of N-ethylmorpholine, and 1.05 g. (0.30 part) of stannous octoate and mixed in a one liter beaker for 8 seconds by stirring at 3000 r.p.m. At this point 174.5 g. (49.50 parts) of tolylene diisocyanate was added to the solution and stirring continued for an additional 7 seconds. The foam charge was immediately poured into a 12" x 12" x 8" paper lined cardboard box and when the foam ceased to rise further it was cured for 15 minutes at 130° C. in an oven.

The foam formed had risen 7.5 inches with little or no evidence of collapse at either the top or bottom and was found to have a cell count of 30–35 cells per square inch with fair to good uniformity. The cell structure was predominantly open cell.

EXAMPLE II

A fluid vinylsiloxane-trimethylsiloxane cohydrolyzate was prepared by adding a solution of 1627.5 g. (15.0 moles) of trimethylchlorosilane and 807.5 g. (5.0 moles) of vinyltrichlorosilane to 297 g. of water. The cohydrolyzate was refluxed at 100° C. until hydrogen chloride evolution ceased and then neutralized with sodium bicarbonate. After filtration and removal of material boiling below 170° C. (4 mm.) the resulting silicone fluid product had an 11.8 centistoke viscosity and refractive index $n_D^{25} = 1.4146$.

A 75 g. charge of a monohydroxy polyoxyalkylene monobutyl ether composed of 50 weight percent oxyethylene units and 50 weight percent 1,2-oxypropylene units and having an average molecular weight of 2800 was dissolved in 75 g. of reagent grade xylene and heated under a nitrogen atmosphere. Xylene was removed (55 g.) until the solution temperature reached 170° C. to remove water from the system and then the temperature was dropped to 165° C. and a solution of 2.5 g. of di-tertiary butyl peroxide in 25 g. of the vinyl siloxane cohydrolyzate described above was added dropwise over a 22 minute period to the rapidly stirred xylene solution. After an additional 28 minutes heating at 165° C. the material was cooled and then stripped of solvent for 3 hours at 150° C. and 5 mm. of Hg in a rotary evaporator to obtain 97 g. of a clear yellow fluid copolymer with a viscosity of 6130 cps. at 23° C. It should be noted that prior to reaction the siloxane and oxyalkylene polymer are immiscible.

The siloxane-oxyalkylene copolymer prepared by the above procedure was tested for ability to stabilize a urethane foam preparation as follows:

One hundred parts, 350 g. of a poly(1,2-oxypropylene)-triol of number average molecular weight 3000 was combined at 25° C. with 4.2 g. (1.2 parts) of the siloxane-oxyalkylene copolymer, 14.0 g. (4.00 parts) of distilled water, 0.35 g. (0.10 part) of tetramethylbutanediamine, 0.70 g. (0.20 part) of N-ethyl morpholine and 1.05 g. (0.30 part) of stannous octoate and mixed in a one liter beaker for 8 seconds by stirring at 3000 r.p.m. At this point 174.5 g. (49.50 parts) of tolylene diisocyanate was added to the solution and stirring continued for an additional 7 seconds. The foam charge was immediately poured into a 12″ x 12″ x 8″ paper lined cardboard box and when the foam ceased to rise further it was cured for 15 minutes at 130° C. in an oven.

The foam formed had risen 7.3 inches with little or no evidence of any collapse at either the top or bottom and was found to have a cell count of 25 to 30 cells per square inch with fair to good uniformity. The cell structure was predominantly open cell.

EXAMPLE III

A fluid vinylsiloxane-trimethylsiloxane cohydrolyzate having a viscosity of 8 cstks. at 25° C. and analyzing for 5.8 wt. percent vinyl groups was prepared using the procedure outlined in Example II.

In a three necked flask equipped with agitator, thermometer, and reflux condenser there was placed 30 g. of the above vinylsiloxane-trimethylsiloxane cohydrolyzate, 100 g. of a monohydroxypolyoxyalkylene monobutyl ether composed of 50 weight percent oxyethylene units and 50 weight 1,2-oxypropylene units and having an average molecular weight of 1500, 50 g. of toluene and 5 g. of t-butyl perbenzoate were heated between 90–120° C. for one hour. The reaction was then sparged with nitrogen up to 140° C. to remove the solvent. The resulting product, which weighed 125 g. was hazeless, had a Gardner color of less than one, and a viscosity of 643 cstks. at 25° C. The product was effective in stabilizing urethane foam compositions.

EXAMPLE IV

A fluid vinylsiloxane-trimethylsiloxane cohydrolyzate having a viscosity of 7.5 cstks. at 25° C. was prepared according to the cohydrolysis procedure in Example II. This cohydrolyzate (20 g.) was reacted at 140° C. with 100 g. of a polyoxyalkylene allyl butyl ether composed of 50 weight percent of oxyethylene units and 50 weight percent of oxypropylene units (average mol. wt. 2900) in the presence of 4 g. of di-tertiary-butyl peroxide catalyst and sufficient toluene to obtain a homogeneous solution. After removal of the toluene a clear graft copolymer having a viscosity of 8,496 cstks. at 25° C. a refractive index of 1.4535 at 25° C. and containing 5.5 weight percent silicon was obtained. The copolymer stabilized urethane foam formulations. A one percent aqueous solution of the copolymer gave a surface tension of 25 dynes cm. at 25° C. and was stable for over a month.

EXAMPLE V

A fluid vinylsiloxane-methylsiloxane-trimethylsiloxane cohydrolyzate having a viscosity of 116 centipoises at 25° C. and $n_D^{25}=1.4188$ was prepared by cohydrolysis of 163 g. (1.5 moles) of trimethylchlorosilane, 80.7 g. (0.5 mole) of vinyltrichlorosilane and 74.7 g. (0.5 mole) of methyltrichlorosilane using a procedure similar to that outlined in Example II. This material was used to make a siloxane-oxyalkylene graft copolymer as follows:

In a three-necked flask equipped with stirrer, reflux condenser and dropping funnel there was placed 60 g. of xylene and 60 g. of a tris-polyoxypropylene monoglycerol ether having an average molecular weight of 3000, a viscosity of 660 centipoises at 20° C. and a hydroxyl number of 56. Sufficient xylene was removed from the flask by distillation to bring the reflux temperature to 165° C. There was then added with stirring over a three hour period a solution of 2 g. of di-t-butyl peroxide catalyst dissolved in 20 g. of the vinyl-containing cohydrolyzate described above, holding the temperature of the reaction flask in the range of 155–165° C. After removal of the solvent and low boiling material the resulting clear fluid oil had a viscosity of 1470 centipoises at 25° C.

The above siloxane-oxyalkylene graft copolymer was effective in stabilizing polyurethane foam formulations.

EXAMPLE VI

A siloxane-oxyethylene graft copolymer was prepared from the vinylsiloxane-trimethylsiloxane cohydrolyzate of Example III by heating 40 g. of this material with 100 g. of monohydroxy polyoxyethylene monomethylether (average mol. wt. 350) and 4 g. of di-t-butyl peroxide in toluene solution at 140–155° C. over a three hour period. After removal of the solvent and low boiling material under reduced pressure a clear, hazeless product was obtained. The starting siloxane cohydrolyzate and oxyethylene polymer were immiscible.

EXAMPLE VII

An allylsiloxane-trimethylsiloxane cohydrolyzate was prepared by the addition of 100 g. (0.57 mole) allyltrichlorosilane and 124 g. (1.14 moles) of trimethylchlorosilane to a mixture of 160 g. of sodium carbonate in 500 ml. of water and 200 ml. of diisopropyl ether. External cooling was used to hold the temperature at 10° C. during the addition. After water washing, filtration and removal of the low boiling material by sparging to 205° C. with nitrogen there was obtained a colorless clear neutral cohydrolyzate having a viscosity of 22 cps. at 23° C. and a refractive index of 1.4247 at 25° C. This cohydrolyzate was used in preparing a siloxane-oxyalkylene graft copolymer as follows:

A mixture of 100 g. of the oxyalkylene polymer described in Example I and 100 grams of reagent grade xylene was dehydrated azeotropically as 72 ml. of xylene was distilled off to attain a solution temperature of 160° C. A solution of 3.3 grams of di-tertiary butyl peroxide in 33.3 grams of the above allylsiloxanetrimethylsiloxane cohydrolyzate was added dropwise over 70 minutes to the stirred xylene solution of oxyalkylene polymer while maintaining a temperature between 151° and 160° C. After an additional 30 minutes at 151° C. the solvent was removed with a nitrogen sparge up to a temperature of 180° C. The resulting clear homogeneous graft copolymer had a viscosity of 960 cps. at 23° C. and $n_D^{25}=1.4590$. This copolymer readily dissolved in water to yield a faintly turbid solution.

EXAMPLE VIII

The monohydroxy polyoxyalkylene monobutyl ether employed in Example I was converted to a monoacetoxy ester by reaction with excess acetic anhydride at 160° C. for 4 hours and removal of low boiling material. Infrared spectral analysis indicated the complete absence of hydroxyl groups and showed a strong ester carbonyl absorption.

A siloxane-oxyalkylene graft copolymer having a viscosity of 776 cps. at 23° C. and $n_D^{25}=1.4537$ was prepared by reacting 100 g. of the above monoacetoxy terminated oxyalkylene polymer with 33.3 g. of an equilibrated vinyl-modified dimethylpolysiloxane fluid having an average of 3 vinyl groups per molecule (average mol. wt. 800) using the procedure outlined in Example VII. This copolymer was found to be useful in the stabilization of polyurethane foam formulations.

EXAMPLE IX

The siloxane, bis-trimethylsiloxyvinylmethylsilane, was grafted to a dihydroxyoxyethylene polymer (having an average mol. wt. 1000) as follows:

In a five liter three necked flask fitted with a thermometer, dropping funnel, agitator and reflux condenser there was placed 974 grams of the dihydroxy oxyethylene polymer. Over a period of forty hours a mixture of 650 grams of the vinylsiloxane and 24 grams of di-tertiary butyl peroxide was added at a temperature of 155° C. Sufficient xylene was used to insure a homogeneous solution. After xylene removal, the adduct was passed through a molecular still. The high boiling component, a waxy solid at room temperature, contained 7.0% silicon equivalent to 20.6% by weight of the vinylsiloxane. This material was water soluble and was useful as an emulsifying agent. In aqueous solution it gave surface tensions as low as 24 dynes/cm. at 0.01 weight percent concentration which is equivalent to the best values obtained with typical organic surfactants.

EXAMPLE X

Following the procedure of Example IX, 11 g. of vinylmethylsiloxane cyclic tetramer was grafted to 100 g. of a monohydroxy polyoxyalkylene monobutyl ether composed of 50 weight percent oxyethylene units and 50 weight percent oxy-1,2-propylene units (average mol. wt. 2,000) using 3.3 g. of ditertiary butyl peroxide catalyst and sufficient xylene to insure a homogeneous solution. After removal of the xylene solvent, the clear hazeless graft copolymer product had a viscosity of 1069 centistokes at 25° C.

EXAMPLE XI

Following the procedure of Example IX, 33.2 g. of nona-methyl-3,5,7-trivinylpentasiloxane was grafted to 100 g. of a monohydroxy polyoxyalkylene monobutyl ether composed of 50 weight percent oxyethylene units and 50 weight percent oxy-1,2-propylene units (average mol. wt. 2000) at a reaction temperature of 165–170° C. using 3.3 g. of di-t-butyl peroxide catalyst and sufficient xylene to insure a homogeneous solution. After removal of the solvent 132.6 g. of a clear, hazeless graft copolymer with a viscosity of 688 centistokes at 25° C. was obtained (viscosity of starting oxyalkylene polymer=340 centistokes).

A 100 g. sample of the above graft copolymer was solvent fractionated using n-hexane and hexane-methanol mixtures. The fractions collected were as follows:

| Fraction | Wt.-percent of adduct | Percent Si | Viscosity (cstks.) |
|---|---|---|---|
| Unfractionated | | | 688 |
| n-Hexane in sol | 37.1 | 3.8 | 872 |
| 1st methanol extraction | 31.5 | 7.3 | 872 |
| 2nd methanol extraction | 12.1 | 8.1 | 544 |
| n-Hexane soluble residue | 20.5 | 15.3 | 650 |

From the above it is apparent that these graft copolymers can be readily solvent fractionated to yield cuts of rather wide siloxane contents.

EXAMPLE XII

The siloxane, sym-tetrakis(trimethylsiloxy)divinyldisiloxane, was grafted to a monohydroxy polyoxyalkylene monobutyl ether composed of 50 weight percent oxyethylene units and 50 weight percent oxypropylene units and having an average molecular weight of 2000 using di-t-butyl peroxide catalyst and xylene solvent following the procedure of Example IX. When 32.8 g. of the siloxane and 100 g. of the oxyalkylene polymer were reacted at 170° C. there was obtained 132 g. of graft copolymer with a viscosity of 364 cstks. at 25° C.

The starting siloxane was isolated from a cohydrolyzate of trimethylchlorosilane and vinyltrichlorosilane by fractionation. It analyzed by vapor phase chromatography as 99% pure, Bromine No., 95 g. bromine/100 g. sample (theory 95.7), and $n_D^{25} = 1.4060$. The same graft copolymer is obtained by employing instead of the peroxide catalyst, an X-ray dosage of 2 megareps.

EXAMPLE XIII

A monohydroxy polyoxyethylene monomethyl ether of average molecular weight 350 was converted to the dialkyl ether by reaction as the sodium salt with ethyl iodide. The resulting polyoxyethylene methylethyl ether was extracted with n-hexane to remove hexane soluble, low molecular weight material.

The above dialkyl ether (100 g.) was reacted with 25 g. of bis-trimethylsiloxyvinylmethylsilane at 155–160° C. using di-t-butyl peroxide catalyst and sufficient toluene to insure a homogeneous solution. After removal of solvent and unreacted siloxane there was obtained 120 g. of a graft copolymer.

Solvent fractionation of the copolymer with hexane and methanol yielded a fraction containing 13.4 weight percent silicon which was an excellent surface active agent. Drops of a one percent solution of this copolymer fraction placed on clean polyethylene surfaces increased in diameter by more than 400 percent. Under comparable conditions the best organic surfactants give spreading on polyethylene which ranges from 90–142 percent.

As stated, the gross reaction products obtained by the procedure of this invention comprise mixtures of unchanged organic polymer molecules, graft copolymer, and polysiloxanes. Separation of the various components, particularly where molecular weights are substantially different, can be accomplished by reason of the different solution and vaporization behavior. It is, moreover, not necessary to isolate the graft copolymers to obtain useful products. In general the gross products behave in combination as do the isolated graft copolymer for the same uses as set forth hereinbefore, particularly where the unreacted polysiloxane content is relatively small.

EXAMPLE XIV

A vinylsiloxane was produced by equilibrating a mixture of 118.3 grams of $(CH_3)_3SiO(CH_3)_2SiOSi(CH_3)_3$, 129.3 grams of cyclic siloxanes composed of

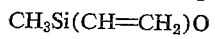

groups and 148.3 grams of $[(CH_3)_2SiO]_4$ employing 100 parts by weight of potassium per million parts by weight of the siloxanes as a catalyst. The product was a clear, water white siloxane that had a viscosity of 18 cstks. The siloxane had the average formula:

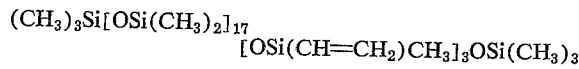

To a 500 ml. 3 neck flask, fitted with a mantle, thermometer, Dean Stark trap, reflux condenser, agitator and an inert gas guard, was charged 100 grams of heavy mineral oil. The oil was a linear aliphatic hydrocarbon having a molecular weight from 260 to 300. The oil was heated to 175° C. and 33 grams of the siloxane produced as described in the preceding paragraph and 3.3 grams of di-tertiary-butyl peroxide was added dropwise over a one hour period. The product was then sparged with nitrogen at 190° C. The product was hazeless on cooling, (simple mixtures of the mineral oil and the siloxane were hazy due to immiscibility). The mineral oil alone had a viscosity of 179.9 cstks. while the grafted material measured 1,610.8 cstks. Clearly the desired grafting of siloxane fluid to the mineral oil had been effected.

EXAMPLE XV

A polyethylene wax having an average of about one olefinic double bond per molecule, a molecular weight of approximately 1,800 and a melting point of 121° C. was reacted with the vinylsiloxane produced as described in Example XIV as follows. To a 500 ml. 3 neck flask fitted as above in Example XIV, was charged 100 grams of the wax and 100 grams of xylene. This mixture was heated to 180° C., removing 66.8 grams of xylene, then cooled to 175° C. A mixture of 33 grams of vinylsiloxane produced as described in Example XIV and 3.3 grams of di-tertiary butyl peroxide was added dropwise to the flask. The first drops of siloxane caused the contents of the flask to become hazy due to immiscibility. To achieve a homogeneous mixture, the xylene removed was returned to the flask and 100 grams of o-terphenyl were added to the flask. The flask temperature was thus lowered to 165° C. and the siloxane was added in 45 minutes. After volatilization of the solvent at 260° C. and 800 microns of mercury pressure, 132 grams of crude graft copolymer was recovered which contained 7.5 wt.-percent Si. A sample of this product, heated in a vial at 140° C. overnight, did not separate into two layers. The melting point of the polyethylene was unaffected by the grafting (it was still 121° C.). Twenty grams of the grafted materials were dissolved in hot xylene and added to 2000 grams of refluxing n-heptane. A precipitate formed (purified graft copolymer). After removal of the heptane, the copolymer was found to contain 6.5 wt.-percent Si.

What is claimed is:

1. A non-crosslinked siloxane-organic graft copolymer produced by grafting (1) a siloxane oil consisting essentially of from 2 to 98 mole-percent of groups having the formula:

   (I)

wherein R is an olefinically unsaturated monovalent hydrocarbon group, R' is a monovalent hydrocarbon group free of aliphatic unsaturation, $a$ has a value from 1 to 3 inclusive, $b$ has a value from 0 to 2 inclusive, and $(a+b)$ has a value from 1 to 3 inclusive; and from 2 to 98 mole-percent of groups having the formula:

   (II)

wherein R' has the above-defined meaning and $c$ has a value from 1 to 3 inclusive to (2) an organic polymer represented by the formula:

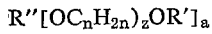

wherein R' is hydrogen, an acyl radical free of olefinic unsaturation or a monovalent hydrocarbon radical free of olefinic unsaturation, R" is a monovalent or a polyvalent hydrocarbon radical free of olefinic unsaturation, $a$ is an integer equal to the valence of R", $n$ is an integer having a value from 2 to 4 inclusive, $z$ has a value from 0 to 200 and at least one $z$ has a value of at least 2, the siloxane portion of the copolymer represents from 5 to 50 percent by weight of the copolymer, said graft copolymer having been produced by heating a homogeneous reaction mixture of (1) and (2) in the presence of a free radical generator and a solvent for (1) and (2).

2. A liquid graft copolymer as defined in claim 1.

References Cited

UNITED STATES PATENTS

| | | | |
|---|---|---|---|
| 3,003,992 | 10/1961 | Mabrey et al. | 260—827 |
| 3,075,948 | 1/1963 | Santelli | 260—827 |
| 3,075,927 | 1/1963 | Lanham | 260—2.5 |
| 2,774,697 | 12/1956 | Koblitz | 260—448.2 |
| 3,069,378 | 12/1962 | Prober | 60—827 |
| 3,075,941 | 1/1963 | Wynstra et al. | 260—824 |
| 3,075,948 | 1/1963 | Santelli | 260—827 |
| 3,088,791 | 5/1963 | Cline et al. | 260—827 |
| 3,131,161 | 4/1964 | Nitzsche et al. | 260—824 |
| 3,219,726 | 11/1965 | Bailey et al. | 260—825 |
| 3,227,777 | 1/1966 | Safford | 260—824 |

FOREIGN PATENTS

| | | |
|---|---|---|
| 735,405 | 8/1955 | Great Britain. |
| 1,085,670 | 7/1960 | Germany. |
| 860,327 | 2/1961 | Great Britain. |

SAMUEL H. BLECH, Primary Examiner

U.S. Cl. X.R.

260—2.5, 824, 827, 46.5, 29.2; 204—159.14, 159.19, 159.2; 252—49.6, 351

PO-1050
(5/69)

UNITED STATES PATENT OFFICE
CERTIFICATE OF CORRECTION

Patent No. 3,573,334            Dated March 30, 1971

Inventor(X) Marshall L. Wheeler, Jr.

It is certified that error appears in the above-identified patent and that said Letters Patent are hereby corrected as shown below:

Column 2, lines 56-57, that portion of the formula reading $$-O\overset{H_2}{C}-\quad \text{should read} \quad -O\underset{H_2}{C}-$$

Column 3, line 42, "includes" should read -- include --.
Column 4, line 10, "includes" should read -- include --.
Column 7, line 73, after "as" read -- well as --. Column 8 line 19, "Silvent" should read -- Solvent --. Column 10, line 63, that portion of the formula reading "OCNH$_2$" should read -- OCNCH$_2$ --. Column 19, line 33, that portion of the formula reading "[OC$_n$H$_{2n}$)$_z$" should read -- [(OC$_n$H$_{2n}$)$_z$ --.

Signed and sealed this 23rd day of May 1972.

(SEAL)
Attest:

EDWARD M. FLETCHER, JR.
Attesting Officer

ROBERT GOTTSCHALK
Commissioner of Patents